April 12, 1938. J. McCLAIN 2,113,662
LIQUID LEVEL INDICATOR
Filed Oct. 6, 1934

INVENTOR:
JOHN McCLAIN
BY: C.T. Parker
ATTORNEY

Patented Apr. 12, 1938

2,113,662

UNITED STATES PATENT OFFICE 2,113,662

LIQUID LEVEL INDICATOR

John McClain, Chicago, Ill.

Application October 6, 1934, Serial No. 747,253

8 Claims. (Cl. 73—327)

My invention relates in general to liquid level indicators and more particularly to gauge glasses for indicating the level of a liquid in a tank, boiler, or the like.

It is well known that gauge glasses, particularly when used on tanks and boilers subjected to internal pressure, constitute a hazard to persons and to property, because of the possibility of their failure under pressure. It is an object of this invention to provide means for reinforcing such glasses to reduce this hazard.

It is also well known that the level of a column of clear liquid in a conventional tubular glass is difficult to distinguish because of the lack of contrast between the column of liquid and the column of air, steam, or the like, above the liquid. I am aware that means for contrasting these columns has been the subject of many inventions; however, it is a second object of this invention to provide an improved and simplified means for distinguishing and emphasizing the height of the column of liquid in the glass.

A further object is to combine these functions of reinforcing and contrasting in a single element, in order to reduce the expense and number of parts required.

Still another object is concerned with providing a glass of generally tubular construction but of such shape that the elements of reinforcement and contrast are inherent in the tube itself.

Other objects of my invention will be apparent in the explanation and drawing which are to follow.

I will now describe certain representative embodiments of my invention with reference to the following drawing.

Figure 3:
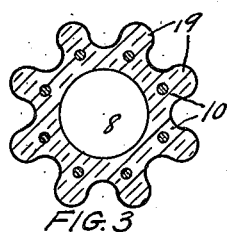
Figure 4:
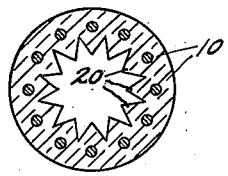
Figure 5:
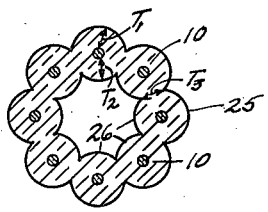

Figures 3 to 5 inclusive, are sections of gauge glasses showing several other embodiments.

Figure 6:
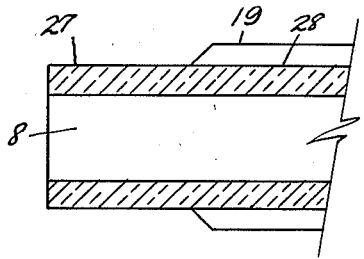
Figure 7:
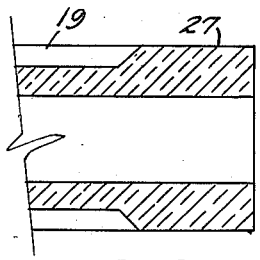

Figures 6 and 7 are partial longitudinal sections of gauge glasses showing methods of providing plain, smooth ends for attachment to the indicator fittings.

Like parts are indicated by like reference numerals throughout.

Figure 1:
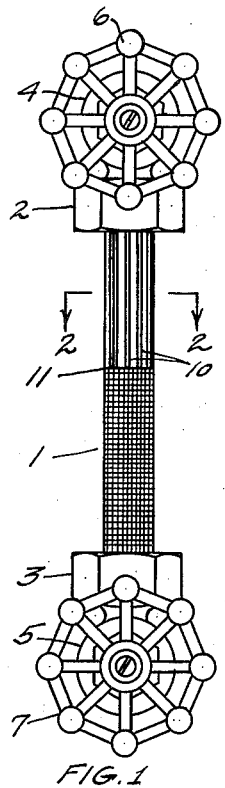
Figure 1 is a front elevation of a liquid level indicator embodying some of the principles of my invention.

In Figure 1, the gauge glass 1 is secured by and between a pair of fittings 2, 3 in fluid tight relationship in the conventional manner. Each fitting has a valve portion 4, 5, respectively, containing a shut-off valve operable by a handle 6, 7, respectively. The valves are in communication with the liquid container (not shown) and can be shut off when it is necessary to adjust or replace the glass.

Figure 2:
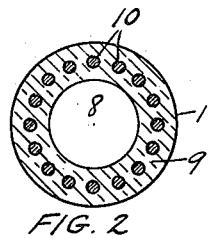
Figure 2 is a section taken through the glass along a line 2—2 in Figure 1.

Figure 2 shows a section of the glass 1, taken along a line 2—2 in Figure 1. The gauge glass 1 consists of a glass tube having a hollow interior 8 adapted to receive the liquid to be gauged. Within the wall 9 of the tube are tubular spaces 10 containing a material having a distinctive color.

As can be seen in Figure 1, this substance, when viewed through the glass alone, as is the case in that portion of the tube above the liquid level 11, appears as a relatively thin column, producing the optical effect in the aforesaid portion of the tube of a number of parallel vertical stripes. When viewed through the column of liquid below the liquid level 11, however, the vertical columns of colored substance are magnified by the lens effect of the liquid in the interior 8 of the tube so that their images overlap one another, causing the portion of the tube below the level 11 to appear practically uniformly colored. That is to say, if the substance is colored black, the portion of the tube below the liquid level 11 appears practically uniformly black throughout, while above the level, the tube has a striped appearance.

This optical effect of the merging of the images is produced by making the stripes of such a size and located at such spacing that when magnified by the liquid column, the image of each stripe is wider than the spacing between stripes.

The contrast can be made more pronounced by omitting the coloring substance from the spaces in the front of the tube so that only the back of the tube is so striped.

While the substance used to fill and color the tubular spaces can be a colored liquid such as ink or any other substance that can be inserted thereinto, I prefer to use wires or rods of a diameter such that they will fit snugly into the spaces and provide a reinforcement for the glass tube. When the indicator is used on tanks containing liquids at high temperatures, or where the temperature of the tube is to be subjected to fluctuations, it is desirable to use wires or rods of an alloy having substantially the same coefficient of expansion as that of the glass in the tube.

Figure 3 shows another embodiment of my invention, illustrated by a cross section of a gauge glass. In this embodiment, the glass consists of a tube having a plurality of prismatic serrations 19 formed in the outer surface of the glass tube. Adjacent to and radially aligned with each of the serrations is a tubular space 10 formed in the wall of the tube and adapted to receive either reinforcing wires or rods, or mere coloring matter as previously described. It is well known that ridges or ribs in any elongated member act to strengthen and reinforce that member. Hence, the tube is strengthened against external forces such as blows, or such stresses as might be set up by a slight misalignment, as well as the force of pressure within the tube.

While Figure 3 shows rounded serrations 19 on the external surface of the tube, the inner surface being smooth, Figure 4 shows an embodiment having angular serrations 20 formed on the inside surface of the tube, the outer surface being smooth. It is not intended, however, to restrict the use of rounded serrations to the outer surfaces of tubes and angular serrations to the inner surfaces, as they can be used in either combination.

There are several methods for constructing glasses of this type, having tubular spaces in the wall or embedded reinforcing rods. One method is to cast the gauge glass with the wires or rods inside. Another is to cast the glass with the spaces cored, the wires being inserted later. This latter method can also be used if mere coloring matter is to be inserted. The glass can also be drawn or extruded through a die of the proper shape. Other methods may be apparent to those skilled in the art.

Figure 5 is yet another embodiment in which the outer surface of the tube has a plurality of ribs or serrations 25 and the inner surface also has serrations 26. The inner ribs 26 are radially in line respectively with the outer ribs 25, while the tubular spaces 10 are each radially in line with an inner and an outer rib. This embodiment is characterized in that the glass is of a substantially uniform thickness throughout; that is, the thickness of the glass between the spaces 10 and the outer surfaces, as indicated by the reference letter $T_1$ is equal to the thickness $T_2$ of the glass between the spaces 10 and the inner surfaces and is also equal to the thickness $T_3$ between the inner and outer surfaces at the mid points between the tubular spaces $T_3$. As all thicknesses of glass are uniform, the tube is less liable to fail due to uneven expansion and contraction due to changes in temperature.

Figures 6 and 7 are longitudinal sections through the end of a tube showing methods of providing plain ends on tubes having serrated outer surfaces.

In Figure 6, the end 27 of the tube is plain and smooth, the serrations 19 being terminated at a distance from the end of the tube. This plain end greatly facilitates making a packed connection with the fittings 2, 3. In this drawing the plain end is flush with the bottom of the depressions 28 between the ribs or ridges 19.

In Figure 7, on the other hand, the diameter of the fitting end 27 is made equal to that at the outer edges of the ribs 19.

Although I have shown and described certain details and embodiments, I do not intend to be limited to such except as set forth in the following claims which I desire to protect by Letters Patent of the United States.

I claim:

1. In a tubular liquid level gauge glass, a plurality of ridges formed in the outer surface of said glass, a plurality of insertions of a distinctively colored substance disposed within tubular spaces, one of said spaces being located adjacent to each of said ridges respectively, the inner surface of said glass having ridges arranged in co-ordination with said outer surface ridges and said tubular spaces, whereby the thickness of the glass between said surfaces and said tubular spaces is approximately uniform.

2. A fluid level indicator comprising a glass tube, said tube having a plurality of ridges formed in a surface of the glass, and a plurality of wires disposed within the wall of said tube, one of said rods being radially in line with each of said ridges.

3. A liquid level gauge glass comprising a glass tube having a plurality of tubular spaces disposed within the wall of said tube and substantially parallel to the longitudinal axis thereof, and wires adapted to be inserted into said spaces, for reinforcing said tube and for providing an optical effect to distinguish the liquid level in the tube, substantially as described.

4. A fluid level indicator comprising a glass tube, said tube having a serrated outer surface including a plurality of ribs disposed substantially parallel to the longitudinal axis of the tube, and a plurality of reinforcing rods disposed within the wall of said tube, parallel to said ribs, each of said rods being adjacent to one of said ribs.

5. A gauge glass having a serrated inner surface including a plurality of ribs disposed substantially parallel to the longitudinal axis of the tube, and a plurality of reinforcing rods disposed within the wall of said tube, parallel to said ribs, each of said rods being adjacent to one of said ribs.

6. A fluid level indicator comprising a glass tube having a plurality of ribs formed in a surface thereof, said ribs extending substantially parallel to the longitudinal axis of said tube, and a plurality of tubular spaces within the wall of said tube, said spaces being parallel to said ribs and filled with a material having a distinctive color.

7. A fluid level indicator comprising a glass tube having a plurality of ridges formed in a surface thereof, said ridges extending substantially parallel to the longitudinal axis of said tube and a plurality of tubular spaces within the wall of said tube, each of said spaces being parallel to and radially in line with one of said ribs respectively, said spaces being filled with a material of a distinctive color.

8. A liquid level indicator comprising a glass tube having a plurality of ridges formed in the outer surface thereof, a plurality of rods disposed within the wall of said tube, each of said rods being located adjacent to one of said ridges respectively, the inner surface of said tube having ridges arranged in co-ordination with said outer surface ridges and said rods, whereby the thickness of the glass between said surfaces and said rods is approximately uniform.

JOHN McCLAIN.